United States Patent
Chu et al.

(10) Patent No.: US 7,826,422 B2
(45) Date of Patent: Nov. 2, 2010

(54) SYNCHRONIZED, SEMI-DYNAMIC FREQUENCY HOPPING METHOD FOR WRAN AND OTHER WIRELESS NETWORKS

(75) Inventors: Liwen Chu, San Jose, CA (US);
Wendong Hu, San Jose, CA (US);
George Vlantis, Sunnyvale, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 757 days.

(21) Appl. No.: 11/738,638

(22) Filed: Apr. 23, 2007

(65) Prior Publication Data
US 2007/0249341 A1    Oct. 25, 2007

Related U.S. Application Data

(60) Provisional application No. 60/745,466, filed on Apr. 24, 2006.

(51) Int. Cl.
*H04W 4/00* (2009.01)
(52) U.S. Cl. ........................................... 370/329
(58) Field of Classification Search ............... 370/328, 370/329
See application file for complete search history.

(56) References Cited

U.S. PATENT DOCUMENTS

| | | | |
|---|---|---|---|
| 5,784,368 A * | 7/1998 | Weigand et al. | 370/350 |
| 5,822,361 A | 10/1998 | Nakamura et al. | |
| 5,862,142 A | 1/1999 | Takiyasu et al. | |
| 6,031,863 A * | 2/2000 | Jusa et al. | 375/132 |
| 6,275,518 B1 * | 8/2001 | Takahashi et al. | 375/135 |
| 7,408,907 B2 * | 8/2008 | Diener | 370/338 |
| 7,580,386 B2 * | 8/2009 | Oliver | 370/328 |
| 2003/0202498 A1 * | 10/2003 | de Heer et al. | 370/338 |
| 2007/0105562 A1 * | 5/2007 | Ji | 455/452.1 |
| 2007/0117537 A1 * | 5/2007 | Hui et al. | 455/405 |

(Continued)

FOREIGN PATENT DOCUMENTS

JP    1 009 182 A2    6/2000

OTHER PUBLICATIONS

Chu et al. "Dynamic Frequency Hopping Community". IEEE P802.22 Wireless RANs. Date: Jun. 29, 2006.*

(Continued)

*Primary Examiner*—Lester Kincaid
*Assistant Examiner*—Nathan Mitchell
(74) *Attorney, Agent, or Firm*—Lisa K. Jorgenson; William J. Kubida

(57) ABSTRACT

A method for creating and maintaining semi-dynamic frequency hopping communities. Each community is a set of neighboring cells, such as wireless regional area networks (WRANs) according to IEEE 802.22, that follow a protocol defining coordinated frequency hopping operations, e.g., hopping is performed by community members according to a leader-defined hopping pattern rather than to channels selected in the prior operation period. Each community has one leader base station and one or more community member base stations. The leader determines membership, calculates hopping patterns for all members, and distributes the hopping information to the community members. Members provide their neighborhood and channel availability information, e.g., information about their sensing results and channel usage of neighboring WRANs. In exemplary communities, the community members are one-hop neighbors, each community member is configured to perform sensing concurrently with data transmissions, and the number of available channels is greater than the number of members.

34 Claims, 7 Drawing Sheets

U.S. PATENT DOCUMENTS

2007/0223419 A1* 9/2007 Ji et al. .................. 370/329
2007/0291725 A1* 12/2007 Kowalski .................. 370/338
2008/0056200 A1* 3/2008 Johnson .................. 370/333
2009/0067354 A1* 3/2009 Gao et al. .................. 370/310
2009/0219909 A1* 9/2009 Ko et al. .................. 370/343

OTHER PUBLICATIONS

Hu, W., Sofer, E., "IEEE 802.22 Wireless RAN Standard PHY and MAC Proposal", XP007902731, Nov. 7, 2005, Internet Citation, [Online], URL:www.ieee802.org/22/Meeting_documents/2005_Nov/22-05-0098-00-0000_STM-Runcom_PHY-MAC_Online.doc, retrieved on Aug. 2, 2007, pp. 1-53.

* cited by examiner

SYNCHRONIZED, SEMI-DYNAMIC FREQUENCY HOPPING METHOD FOR WRAN AND OTHER WIRELESS NETWORKS

CROSS-REFERENCE TO RELATED APPLICATIONS

This application claims the benefit of U.S. Provisional Application No. 60/745,466 filed Apr. 24, 2006, which is incorporated herein by reference in its entirety.

BACKGROUND OF THE INVENTION

1. Field of the Invention

The present invention relates, in general, to communication systems that include cognitive radios and/or software defined radios (SDRs) to achieve efficient and reliable spectrum use without harmful interference to incumbent services such as television (TV) receivers, and, more particularly, to a method, and systems/devices configured to perform such a method, for controlling spectrum use by base stations and consumer premise equipment so as to allow unlicensed radios or other communication devices to operate in broadcast bands previously set aside for licensed users or services such as the TV broadcast bands. The method and related systems may be developed in some embodiments to comply with standards and protocols distributed by the IEEE 802.22 Working Group.

2. Relevant Background

It is a prominent goal of many countries to provide wireless broadband access or digital cellular communications to all or large portions of their citizens. In many countries, up to fifty percent or more of the population is in rural and remote areas away from cities and urban areas which can receive wireless services with existing infrastructure. Recent studies have indicated in the radio spectrum that licensed bands, such as TV or UHF bands, are underutilized. In the United States, the Federal Communications Commission (FCC) issued the "TV band Notice of Proposed Rule Making (NPRM)" that proposed allowance of unlicensed radios to operate in the TV broadcast bands as long as no harmful interference is caused to incumbent services such as TV receivers. In response, the Institute of Electrical and Electronics (IEEE) formed the IEEE 802.22 working group in 2004 to develop protocols for an interoperable air interface for use in spectrum allocated to TV broadcast service and enable providing wireless services such as broadband access with a point to multipoint wireless regional area network (WRAN). The WRAN system is intended to provide packet-based transport capabilities such as wireless broadband services such as Internet access, data transport, streaming video, VoIP, and other services that are presently available to much of the population using digital subscriber (DSL) technologies or digital cable modems.

WRAN technology has been initially targeted at wireless broadband or remote access for geographically dispersed, sparsely populated areas. The use of TV broadcast bands or UHF bands as a license exempt spectrum for WRAN provides a non-line of sight transmission range of up to 100 kilometers but more typically 30 to 70 kilometers, which is significantly greater than ranges available with WiFi and wireless networks. The target markets or users of the WRAN-based services are single family residential units, multi-dwelling units, small office/home office (SOHO) locations, small businesses, and remote public and private campuses. A WRAN system based on IEEE 802.22 protocols will likely make use, in a non-interfering manner, of unused TV broadcast channels, i.e., TV channels with bandwidths of 6, 7, and 8 MHz in a frequency range of 41 to 910 MHz (e.g., 54 to 862 MHz in the United States with a 6 MHz channel bandwidth).

An IEEE 802.22 system is generally a fixed point-to-multipoint wireless air interface in which the point is a base station (BS) that manages its own cell or coverage area and all associated consumer premise equipments (CPEs) or multipoints. Each CPE represents the user of the wireless services provided by the BS operator. During operations, the BS controls the medium access in its cell such as by setting the channel used for BS and CPE broadcasts to form the wireless link. The BS transmits in the downstream to the various CPEs, which respond back to the BS in the upstream direction, and these communications may be thought of as downlink and uplink communications or signals. The BS and CPE need to be designed to communicate without interfering with licensed or primary users. With this in mind, the BS manages spectrum or channel usage and uses sensing of existing channels to protect incumbent or primary users. To achieve distributed sensing, cognitive radio and/or software defined radio technology provides real-time sensing of spectrum usage. For example, the BS of the WRAN generally will be capable of performing distributed sensing which involves the CPEs sensing the spectrum and sending periodic reports to the BS. The sensing may be in-band to sense on the channel being used by the BS and CPE and/or out-of-band to sensing on the other channels (such as with an omni-directional antenna). Incumbent sensing also generally includes the BS periodically quieting the channel to allow in-band measurements to be carried out. If an incumbent or other use is detected by the BS based on reported measurements and preset interference detection thresholds, the BS makes the decision of whether to continue using the channel or to vacate the channel (i.e., to switch or hop to another vacant frequency). In addition to protecting incumbent or licensed services, WRANs under IEEE 802.22 are unlicensed and a BS servers a large area. As a result, coexistence amongst overlapping or coallocated cells must be managed and controlled by the BSs of the WRAN so that self-interference among neighboring BSs does not render the system useless.

In some proposed WRAN, each BS operates on a single channel for an operation period (e.g., up to 2 seconds as presently indicated by IEEE 802.22 protocols) and then performs sensing during a quite period (e.g., 20 to 100 milliseconds depending on sensing technology and mechanisms utilized by the BS and CPEs). If an incumbent or other use of the channel is sensed, the BS halts operations until the channel later becomes available. A single channel WRAN is effective in protecting incumbent services, but halting operations or data transmissions during a quiet time results in underutilization of the channel to transmit digital data (e.g., in about every 2 second period there is up to 100 milliseconds without transmissions).

To more effectively utilize the available channels, WRAN have been proposed in which each BS operates on two available channels. In these WRAN, frequency hopping is used such that when an operation period ends on one channel the BS and corresponding CPEs switch transmission to the other channel. The IEEE 802.22 protocol requires sensing prior to use of the second channels, and the BS is designed to perform distributed sensing of the second channel in parallel with the end of the operation period or transmission on the first channel. Hence, the BS can hop to the second channel at the end of the operation period, and there is no or little lag between consecutive operation periods, which results in significantly improved utilization of the available channels and enhanced quality of service (QoS). A problem, however, may arise if there are neighboring BSs with overlapping coverage or service areas. In these cases, collisions can occur when two or more neighboring BSs switch or hop to the same channel or to interfering channels at the same time or at substantially the same time. The channel that was selected for hopping by the two neighboring BSs appeared to be available to both BSs prior to the frequency hop or switch. Establishing and maintaining communications between one-hop neighboring BSs may be used to avoid collisions, but this may add complexity and design issues related to channel switching negotiations and in managing inter-system communications.

Hence, there remains a need for improved methods, and devices that implement such methods, for managing use and allocation of the radio spectrum in WRAN and other networks that communicate over channels in unused but licensed bands such as by using the TV bands of the radio spectrum. Preferably such methods and devices would be configured to be compliant with IEEE 802.22 protocols including protocols requiring protection of incumbent services such as digital and analog TV while providing higher utilization of available channels and controlling the risk of frequency hop collisions for neighboring BSs with no or limited inter-system communications and/or negotiations.

SUMMARY OF THE INVENTION

To address the above and other problems, a method, and associated systems implementing such a method, is provided to create and maintain semi-dynamic frequency hopping communities (SDFHCs or, more simply, DFHCs). Each DFHC is a set of neighboring cells (such as WRANs according to IEEE 802.22 or other wireless communication protocols) that follow a common protocol that supports a coordinated dynamic frequency hopping (DFH) operation (e.g., hopping is performed by each member of the DFHC according to a leader defined hopping pattern or sequence rather than to a channel selected dynamically during each operation period). The use of DFHC provides mutual interference-free channel sensing and minimizes or provides more effective channel usage by allowing fewer channels to support a larger number of frequency hopping WRAN. Each DFHC has one leader and zero or more community members (e.g., the BS in each member WRAN is either a leader or a member). The leader BS is responsible for making decisions about community membership, calculating the hopping patterns (e.g., phase-shifting sequences for DFH or other useful patterns) for all members and distributing this and other hopping information to the DFHC members. Members provide the leader with their neighborhood and channel availability information, e.g., information about their sensing results and observed channel usage of neighboring WRAN cells. For a group of BSs operating WRAN cells to create a DFHC, the following attributes generally will be present: community members are able to communicate with the community leader (e.g., be one-hop neighbors or otherwise be able have inter-BS communications), each community member is configured to perform sensing concurrently with data transmissions, community members have reasonably well synchronized clocks, and the available or vacant channels should be of a greater number than the number of members of the DFHC.

More particularly, a communication system or network is provided for managing use of channels in a frequency spectrum, such as channels in the TV band, that has available channels and unavailable channels, e.g., that are in use by incumbent services such as licensed users. The system includes a base station that is wirelessly communicating with consumer premise equipment sites and that is also functioning as a leader of a frequency hopping community (e.g., a community of WRAN cells or the like). The system also includes a set of base stations that are also each wirelessly communicating with a plurality of consumer premise equipment sites, and these base stations are functioning as members of the frequency hopping community. In the system, the leader base station generates a hopping pattern that defines a dwell time for data transmissions or operation periods and also defines start times for these operation periods on each channel in a working set of channels for the leader and member base stations in the community. The hopping pattern also defines when each of the base stations should switch or hop and which one of the channels in the working set is to be the target of the hop or switch. The leader transmits the hopping pattern to the member base stations and the leader and member base stations perform the wireless communications with the consumer premise equipment sites according to the hopping pattern.

In the described system, the working set is a subset of the available channels in the frequency spectrum, e.g., the TV band of the radio spectrum, that have been validated as vacant or available for use by sensing, e.g., distributed RF sensing, performed by the base stations and the consumer premise equipment sites. The number of the channels in the working set is at least one more than the number of base stations in the community including the leader base station as well as the member base stations, and in some embodiments, the number of working channels is exactly one more than the number of base stations as this provides one channel that can be sensed during a quiet time while the other channels can all be in use for data transmissions. In the system, the hopping pattern is not generated during each operation period but is instead generated before hopping operations begin and defines frequency hopping over a plurality of operation periods (e.g., a sequential hopping pattern is defined and repeated while the status of the base stations and the available channels in the working set remain stable). The hopping pattern also defines a quiet time on each of the working channels between consecutive ones of the operation periods on that channel, and the base stations perform sensing on the channel during this quiet time to validate its vacancy or availability for their continued use. In the hopping pattern, the start times for the operation periods are typically not the same for each base station and, instead, the start times may be thought of as a sequence of start times in which a next start time is offset from the immediately prior start time by a preset amount of time (e.g., by at least about the quiet time, which in turn may be determined by dividing the dwell time or operation period length by the number of community members).

DETAILED DESCRIPTION OF THE PREFERRED EMBODIMENTS

The present invention is directed to methods and systems for creating and maintaining synchronized, semi-dynamic frequency hopping communities or DFHCs. Each DFHC includes one or more wireless regional area networks (WRANs) having a base station (e.g., an IEEE 802.22 self-coexist base station (BS)) providing wireless service such as digital cellular communications, broadband access to the Internet, and the like to consumer premise equipment (CPE) or end users (e.g., residences or small businesses). One feature of the DFHC method is that one-hop BS neighbors cooperate to create a DFHC and a leader of the DFHC is selected from among the BS neighbors, such as by using a priority value previously assigned to each BS. The elected leader generates a set of hopping information for the DFHC including a hopping schedule or pattern that defines when each member of the DFHC should hop to a different channel and also defines which channel the member should hop to from among a set of working channels (e.g., a subset of channels determined to be available in a particular spectrum such as the TV band). During operation of the DFHC, the community members hop in a synchronized manner among the working channels according the leader's decision or hopping information provided to each member's BS. All the members of a DFHC use the same set of working channels and each acts to sense incumbent or other interference on a "next hop" channel, i.e., the working channel that is unused during a quiet time but has been selected or predefined by the hopping pattern as being the next channel to use by one of the DFHC members. The hopping information typically is not changed by the leader while the DFHC is stable, which generally happens when no community member has recently joined or left the DFHC and the active working channels remain usable or available as determined by sensing mechanisms employed by the CPE and BS (e.g., distributed sensing as called for by IEEE 802.22 specifications to protect incumbent services). As will become clear, the DFHC method avoids hopping collisions, which are a concern for neighboring BSs that operate in hopping mode, without a need for real-time inter-BS communications to control collisions.

Figure 1:
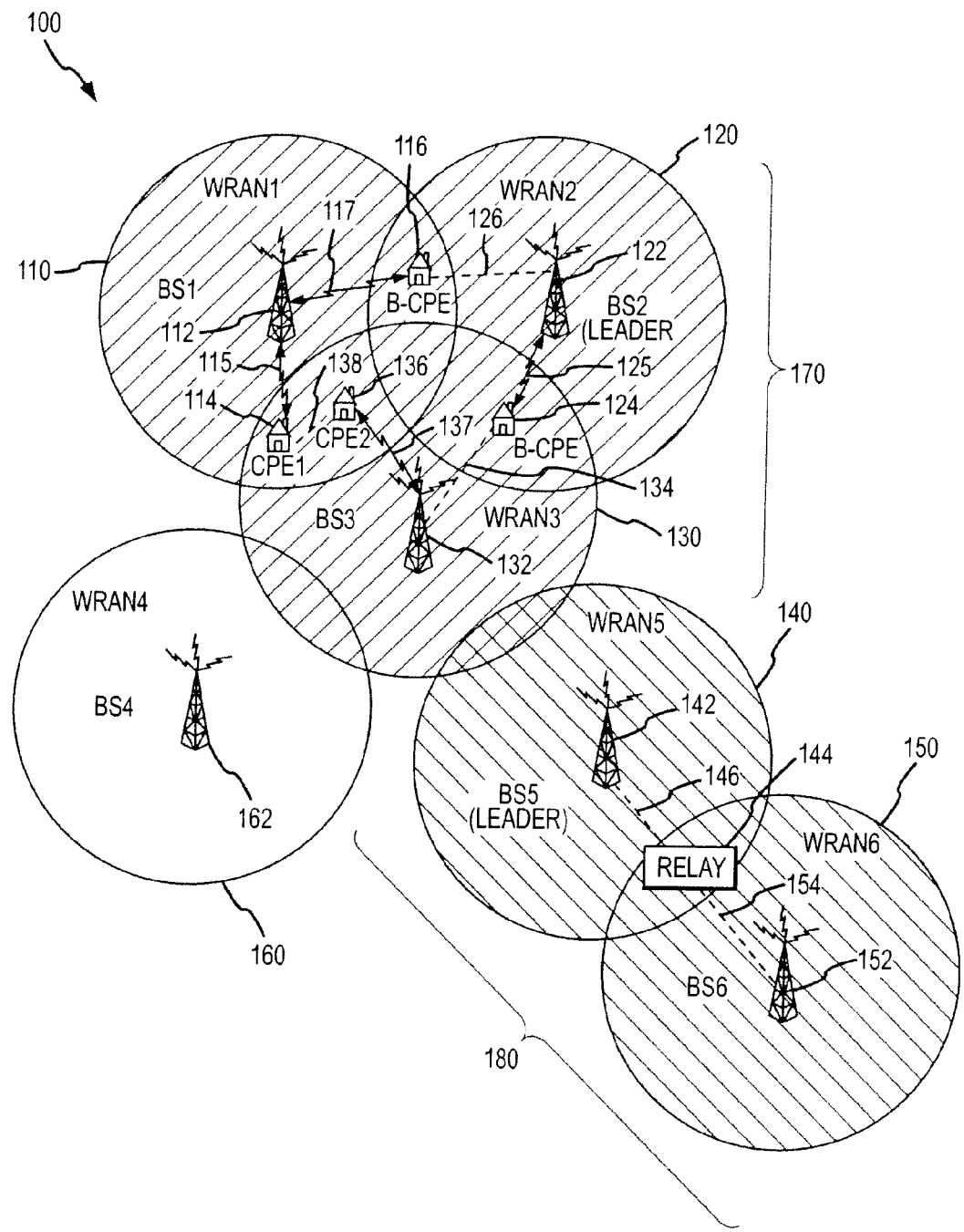
FIG. 1 illustrates a WRAN system with a number of WRANs that are organized into two semi-dynamic frequency hopping communities (SDFHCs) with more than one member in each community in accordance with the invention and a single WRAN operating individually (e.g., in non-hopping mode or in SDFHC hopping mode with one leader in a community with non-shared channels)

FIG. 1 illustrates a system 100 of a plurality of WRANs that are organized in accordance with the semi-dynamic frequency hopping community concepts of the present invention. Many wireless communication networks may be arranged using these concepts, and the concepts are particularly well suited for use with WRAN configured according to the protocols and specification of IEEE 802.22. With this in mind, the system 100 is shown to include six WRANs 110, 120, 130, 140, 150, and 160 that each includes a base station 112, 122, 132, 142, 152, and 162, respectively, that provides a point-to-multipoint arrangement in which a base station is used to provide a service such as digital cellular communications, wireless broadband access to provide an Internet or similar connection, or other wireless service. The base stations 112, 122, 132, 142, 152, and 162 are configured in some embodiments as 802.22 base stations that communicate over licensed bands such as the TV bands of the radio spectrum to a plurality of CPEs in their cells or coverage areas, which are shown by the circular outline in FIG. 1. The communications between the BS and CPE is performed while protecting incumbent or primary services, such as existing TV broadcasters/receivers, such as through the use of distributed sensing performed by the CPE and reported to the BS for processing to allow coordinated channel selection. The BS and CPE are not shown in detail in FIG. 1, but in IEEE 802.22 embodiments, the BS and CPE of the system 100 would include transmitter and receiver equipment to facilitate communication over the TV band. The BS and CPE may be configured according to cognitive radio technologies to include equipment for sensing use of frequencies or channels and to process such sensed energies or information to make channel selection decisions (as discussed in detail below with reference to operation of the base stations of the invention).

As shown in FIG. 1, the system 100 includes two DFHCs 170, 180 with BS4 162 operating a standalone WRAN 160. For example, there may be a determination, such as by operation of the BSs along with serviced CPE that there 9 or more available channels in the geographic region of the system 100. In this cases the WRAN 160 operated by BS4 162 to use one of these channels as its working channel in non-hopping or normal mode or to use two of these channels as its working channels in a dynamic frequency hopping community (DFHC) mode. The other five WRAN may be organized into the DFHC 170, 180 to use the other 7 available channels. Specifically, DFHC 170 may include WRANs 110, 120, 130 with the BS2 122 being the "leader" that operates, as explained in detail below, to set or define the set of working channels used by the DFHC 170 and also the hopping information for each member base station (i.e., BS1, 112, BS2, 122, and BS3 132). Likewise, DFHC 180 may include WRANs 140, 150 operated by BS5 142, and BS6 152 with the BS5 being the leader of the DFHC 180 that defines or generates the hopping information for the members BS5 142, BS6 152.

The hopping information can be thought of as a hopping pattern or sequence that defines the starting time for each BS to operate on a particular channel in the working set, the dwell or operating time on the channel, the quiet or sensing time, and the next channel to hop to and hop time. As will become clear, each DFHC 170, 180 needs a free or extra channel above the number of members to provide a useful hopping pattern while allowing proper sensing of channels as called for in IEEE 802.22 protocol (e.g., sensing for incumbent services or other users of a channel prior to beginning use of that channel or hopping to that channel). With this in mind, the DFHC 170 typically will have 4 or more available channels in its working set and DFHC 180 will have 3 or more available channels in its working set. The leader BS 122 or 142 acts to implement this N+1 rule (with N being the number of members in a DFHC 170, 180) to determine a minimum number of working channels for a community.

Neighbor base stations within a community need to communicate with each other to maintain neighbor relationships. Likewise members in neighboring communities need to communicate with each other to transmit working channel information to make sure that the neighboring communities have no overlapping working channels. Communications among BS in a DFHC 170, 180 or among neighboring BS (such as when a BS is attempting to join a DFHC 170, 180) may be handled in a number of ways to practice the invention. For example, BS1 112 and BS2 122 of DFHC 170 may communicate by use of a single CPE 116 that acts as a bridge or bridge CPE. Generally, such a bridge CPE 116 will be physically located within an area where the coverage area or cells of the WRANs 110, 120 overlap. The CPE 116 includes an antenna that is directed to communicate service related data 117 (i.e., sensing reports and digital data transmissions related to the service provided by BS1 to the CPE 116 such as wireless broadband access transmissions) and also include an antenna for communicating a community signal 126 to the leader BS2 122 that may include all messages sent between BS1 112 and BS2 122 to create and maintain the DFHC 170 (such sensing information, hopping information, and the like). A bridge CPE 124 that receives service signals 125 from leader BS2 122 is used by the BS2 to communicate community messages or signals 134 with neighboring BS3 of DFHC 170. Alternatively, a pair of CPE may be provided within such an overlapping region between neighboring BS to provide community-based communications. Such an arrangement is used by BS1 112 to communicate with BS3 132, and in this case, a first CPE 114 receives service signals 115 from BS1 112 while a second CPE 136 receives service signals 137 from BS3. Such service signals 115, 137 are also used to communicate community messages that are relayed as appropriate to the other CPE 114 or 136 as shown with community signal 138 (such as by a separate antenna directed at the other CPE) for forwarding in a service signal 115, 137 or separate signal to the BS1 112 or BS3 132. In another configuration as shown for DFHC 180, a relay 144 can be provided between pairs of neighboring BS5 142 and BS6 152 of a DFHC 180 facilitating community signals or inter-BS communications 146, 154 to be transmitted and received. One or more of these or other techniques may be used to provide transfer community messages such as messages that include hopping information and community creation and maintenance information between members of WRAN communities in accordance with the present invention.

The number of BSs and DFHCs included in a system such as system 100 may vary widely to practice the invention. However, there are a number of characteristics or attributes that BSs working in DFHC hopping mode will generally share. The channels available for use by a set of BSs that are in or are about to form a DFHC will be more than the number of BSs. For example, if two BSs are determining whether to form a community, there preferably will be 3 or more available channels that the two BSs can use to hop among in a synchronized manner. Note, that this allows frequency hopping to be used by the two BS whereas standard dynamic frequency hopping may require 4 available channels to eliminate the risk of hopping collisions with each BS having two channels for its sole use. In this regard, another attribute of DFHC hopping mode is that there is no channel sharing among neighboring DFHCs or among a member(s) of the DFHC and a neighboring BS (e.g., BS4 in FIG. 1 that may be operating in non-hopping mode or in standard dynamic frequency hopping mode with its own or non-shared set of working channels). Additionally, the DFHC preferably is operated such that the quiet time on a channel meets protocol or requirements of the particular communication network (such as IEEE 802.22 quiet time or sensing requirements). Further, in typical embodiments, the members of a DFHC will be one-hop neighbors of each other so as to facilitate communications among the members of the community and between the leader and the members (e.g., transmittal of hopping information). A community leader (such as BS2 122 and BS5 142 in system 100) is elected, and such election may be performed based on a selected priority value assigned to each BS with a tie breaker such as MAC address used in cases of a tie or equal priority values. Each member of a community uses the same set of working channels, and the community leaders, such as BSs 122, 142 in the system 100 of FIG. 1, selects this set of working channels and calculates the hopping information for each community member using these working channels. During operations, the community members hop among the working channels of the DFHC based on the hopping information provided by the leader.

As noted above, each base station or BS of a DFHC in accordance with the invention is configured generally in accordance with IEEE 802.22 or other wireless network protocol and/or specifications such as to provide a particular wireless service and with transmitters and/or receivers as necessary to communicate with a plurality of CPE and, in some cases, to communicate with neighboring BSs. These components are not shown in the figures but are well known to those skilled in the arts such as those skilled in the fields of cognitive radio and digital cellular communications. Additionally, each base station is generally adapted for processing sensing reports or information from CPE in its cell or coverage area to comply with IEEE 802.22 requirements that incumbent services be protected and only available channels be utilized as working channels of a DFHC. A representative base station 210 is shown in functional block form in FIG. 2, and the base station 210 is shown to include a processor 214 that operates to execute or run a set of BS operation modules 218 and to manage memory 250. The processor 214 and modules 218 may be used to provide sensing mechanisms and other operations expected of a BS configured to operate according to IEEE 802.22.

Yet further, base station used in DFHC of the invention generally will be adapted such that the processor 214 operates to run a DFH community manager 220 in a leader or member mode to provide the DFHC functionality described herein. The manager 220 may be implemented in hardware, software, or a combination of the two, with software applications or routines being used in a typical base station 210 to implement the DFHC functions. As shown, the DFH community manager 220 includes a number of modules or routines to provide the DFHC functions and these include a BS and CPE communication module for generating and processing messages sent among neighboring BS and CPEs within a cell to create and maintain DFHCs. A creation module 230 is provided to control community creation and generate hopping information. The module 230 may, for example, include subroutines such as a leader election algorithm or routine 232, a member join or add routine 234, and a hopping information generator 236. The manager 220 also functions to maintain a community of WRANs or BSs, and to this end, a maintenance module 240 may be included in the manager 220. The functionality of these modules is explained in detail below with reference to FIGS. 3-7, and memory 250 may be used by the manager 220 via processor 214 to store information used in DFHC creation and maintenance/operation such as a usable or available channel set 252, a set of neighboring BSs (or WRANs) 254, a list of the present community members and, in some cases, their status 258, a working channel set 262 that has been selected by a leader from the available set 252, and a leader-defined/provided set of hopping information 266 (e.g., setting the start time for a hop, the dwell time, the quiet time, the set of working channels, and the like).

A system configured according to IEEE 802.22 operates to cognitively and continuously or periodically switch operation frequencies for its data transmissions. In a DFHC of the present invention, in contrast, both the frequency hopping sequence and the length of an operation period on a channel for each BS in the DFHC is determined by the BS acting as the community leader. For example, the hopping information may be set at the initialization of the DFHC or in response to a change in the operating environment such as a channel becoming unavailable or a change in the membership of a DFHC. Hence, the DFHC of the present invention may be thought of as implementing a synchronized frequency hopping that is semi-dynamic rather than fully dynamic because the hopping pattern is fixed or defined and simply repeated for all members of the DFHC as long as the community membership and the working channel set remain stable.

Because each of the DFHC in a system of the present invention, implements a synchronized, semi-dynamic form of frequency hopping, it may now be useful to describe dynamic frequency hopping (DFH). In an IEEE 802.22 system, the BS and CPEs perform data transmissions and sensing (e.g., RF sensing) on a set of channels. For example, data transmission may occur on Channel A and then RF sensing may occur on channels [0, A−n] and also on channels [A+n, N] during each operation period where channel "0" and channel "N" provide the lower and upper bounds of the particular set of channels or the sensing spectrum and "n" is the number of channels in a guard band (e.g., an IEEE 802.22 defined band to guard against hopping too close to active channels which may result in interference or damage to an incumbent or other service operating on a channel). A WRAN system in DFH mode uses the working or in-band channel for data transmission and performs sensing on out-of-band channels simultaneously (or in parallel) so that the BS can be assured that the channel that is to be hopped to or switched to is still available for use (e.g., to comply with periodic sensing requirements of IEEE 802.22 rather than using a single channel and using quiet or sensing time on that single channel). Guard bands between the in-band and out-of-band channels are allocated to mitigate adjacent interference caused by data transmission to the out-of-band sensing. An out-of band channel that is sensed to be vacant is then considered to be validated and available as a target for switching or hopping to allow a presently used working channel to be sensed and/or validated for further use.

Standard DFH mode may be implemented by dividing the time axis into consecutive operation periods. In each of these periods, a WRAN is operating on a validated channel while simultaneously sensing and validating out-of-band channels. A WRAN system, i.e., its BS, operating in standard DFH mode dynamically selects one of the channels validated in a previous operation period for data transmission in the next operation period. According to IEEE 802.22, this channel can be used for data transmission for a dwell time of up to 2 seconds (e.g., a maximum channel detection time) after the time it was validated. In order to perform reliable sending in standard DFH mode, the channel being sensed cannot be used for data transmission by the WRAN cell. This implies that a single WRAN cell operating in standard DFH mode needs at least two channels in its available channel set in order to perform data transmissions and reliable sensing in parallel and without interruptions to data transmissions or service by BS to the CPE. And while in standard DFH, N overlapping channels may operate in N+1 channels, such an operation requires real-time communication and resolution of channel hopping collisions. Hence, the available channels would have to be twice the number of BS or WRAN for a particular service area.

However, channel usage can be enhanced by having spatially overlapping or one-hop neighbors cooperating to form DFH communities or DFHCs. Referring again to FIG. 1, standard DFH mode would require that twelve channels be available for use by the six WRANs 110, 120, 130, 140, 150, and 160 with each using two of the channels to avoid channel hopping collision. In contrast, the use of DFHCs and a leader-defined hopping pattern allows the WRANs 110, 120, 130, 140, 150, and 160 to operate in semi-dynamic frequency hopping mode with less channels. For example, WRAN4 may operate in standard DFH mode and have two channels, and DFHC 170 with its three WRANs 110, 120, 130 may utilize four channels (or N+1 channels where N is the number of members of the DFHC) and DFHC 180 with its two WRANs 140, 150 may utilize three channels (or N+1 channels). In this example, only nine channels are used by the six WRAN rather than twelve vacant channels (i.e., channels that are free of both incumbents and other WRANs).

As discussed above, each DFHC has a base station or BS that acts as a leader. The leader BS decides if the DFHC can accept a new neighbor as a member of the DFHC. The leader may be selected in a number of ways to practice the invention. For example, as described in relation to FIG. 6, a useful algorithm (such as may be implemented by member join/add module 234 of FIG. 2) that may used for determining if a neighbor can join a DFHC is to determine if the requesting BS is part of a one-hop WRAN or neighbor and if the existing available channel set of the DFHC can accommodate another member (e.g., the new number of members N' will be such that N'+1 is equal to or less than the number of channels in the available channel set for the DFHC). The leader of each DFHC also generates the frequency hopping sequence or pattern of the whole DFHC (e.g., by selecting a subset of the available channel set as a working set of channels, setting operation periods, assuring compliance with channel validation including quiet times, and defining jump or start times for each channel in the working set) and notifies each of the DFHC members to provide them this hopping information. The DFHC leader also maintains the DFHC state and may act to reset the hopping sequence or pattern when a member leaves or becomes inactive (or by leaving the sequence in place but marking a now unused position as available for a next joining member).

Figure 2:
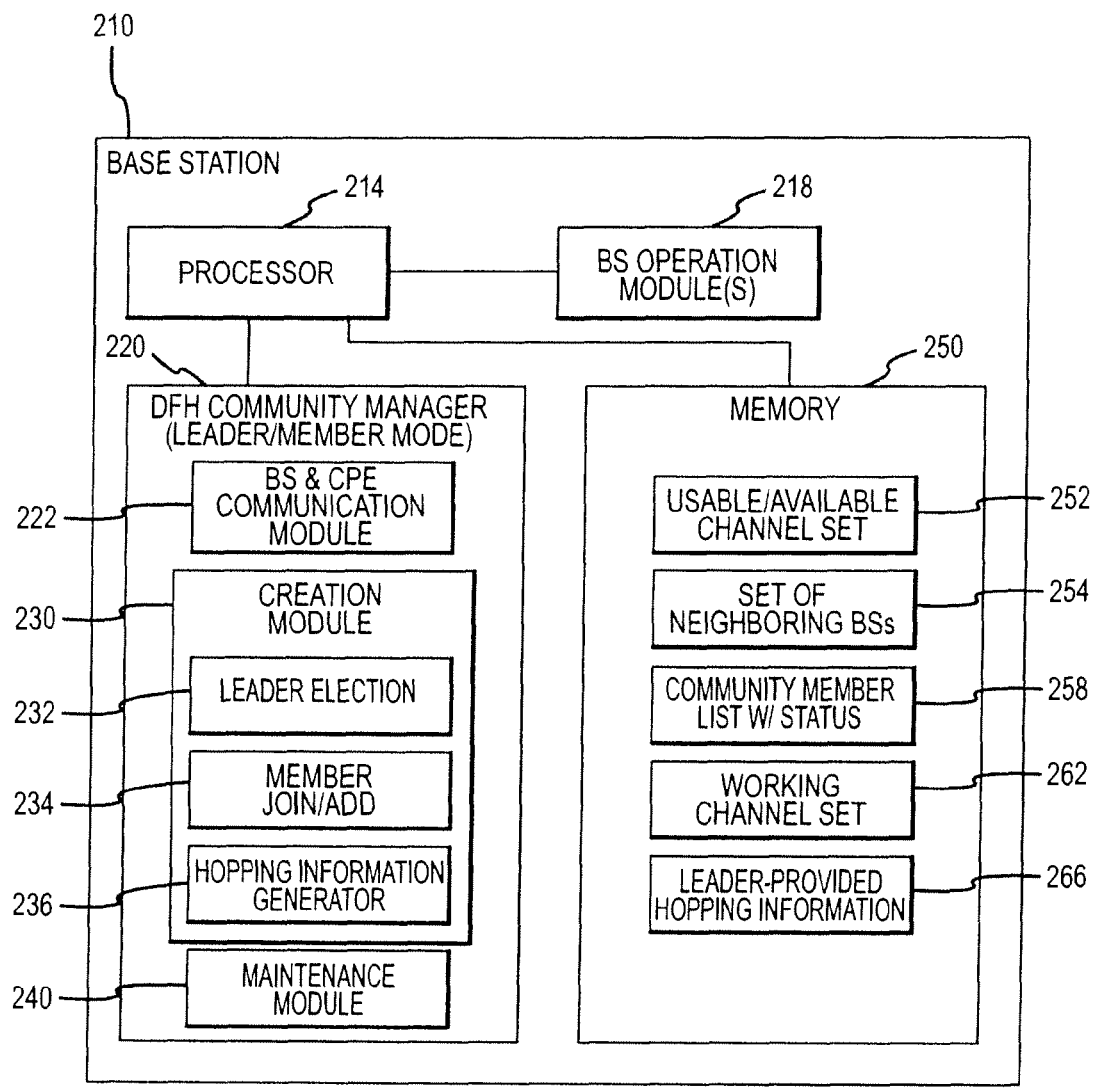
FIG. 2 illustrates in functional block form an exemplary base station showing a DFH community manager and its functional components along with useful data sets stored in memory of the base station (or accessible by the base station)
Figure 5:
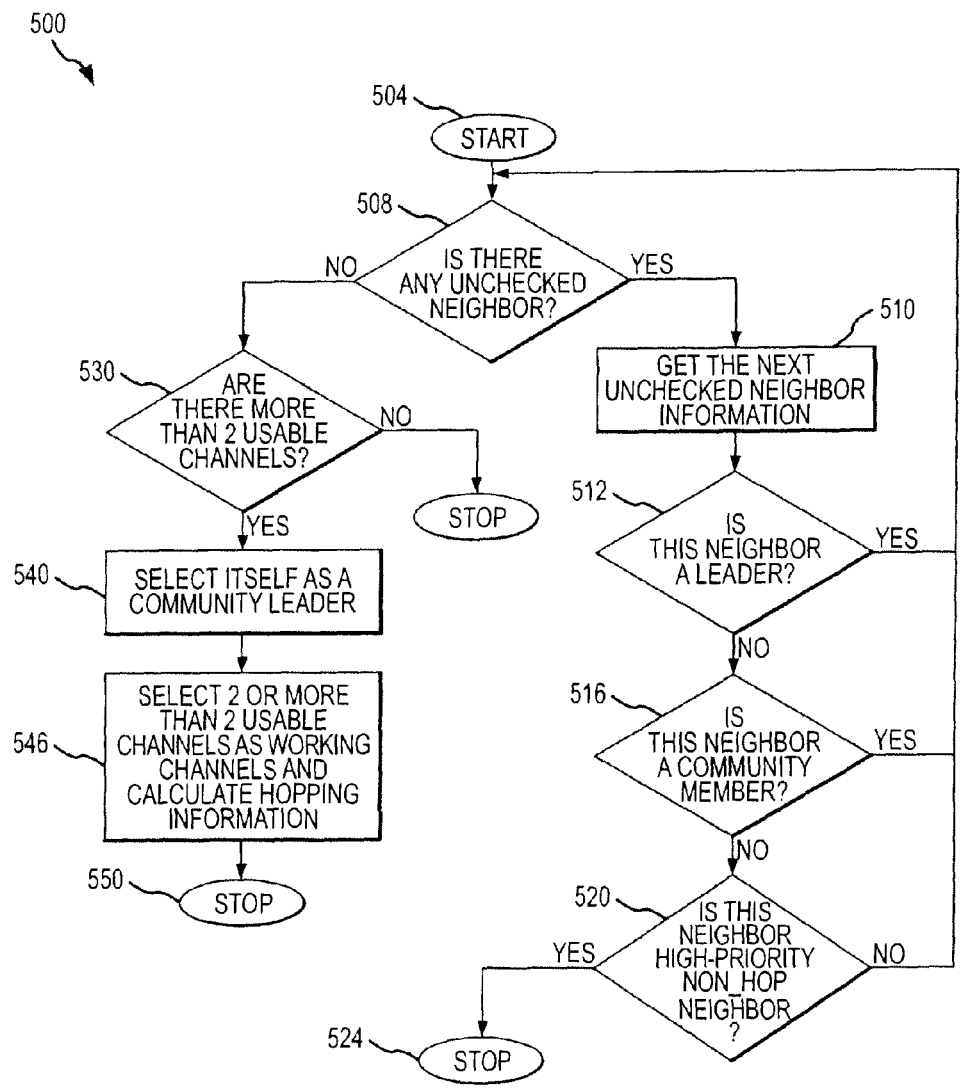
FIG. 5 is a flow diagram illustrating creation of a DFHC including a leader election algorithm.

A number of leader selection techniques can be used to practice the invention, e.g., see the procedure shown in FIG. 5, and may be provided by the leader election routine 232 of the creation module 230 shown in FIG. 2. For example, a priority number (e.g., a random number) may be assigned to each BS and this priority number may determine the leader of a DFHC such as by using the highest value or lowest value of the priority number. If there is a tie generated by this technique, a tie breaking mechanism may be used such as by based on the value of the MAC address for each BS (e.g., using the higher or lower of the MAC address for the tied leaders from the priority information election). A new selection may be performed when the leader leaves the DFHC or if two DFHC join to form a single DFHC. Typically, a DFHC expanding to include one or more new members will not result in a selection of a new leader, but in some embodiments, an election may be held upon the change of state of the DFHC such as the adding of a new member.

With a leader selected and with reference to FIG. 2, the base station of the leader may operate in the following manner. The manager 220 may use the hopping information generator 236 to process the set of neighboring BSs 254 or at least those requesting membership and the available channel set 252 to select a working set of channels 262 and to generate a set of hopping information 266, which defines the hopping pattern or sequence for all the BS in the list 258. The hopping information 266 is transmitted, such as in a message generated by the communication module 222 to each of the member BSs from the leader BS. During a DFH operation cycle, each BS schedules its system (i.e., the BS and the CPEs in the WRAN) to switch or hop to the channel defined in the hopping pattern or sequence at a particular start or hop time (e.g., hop to Channel A at time t). The BS and CPEs perform data transmissions on Channel A, and in parallel, the BS performs and schedules CPEs to perform spectrum sensing on channels [0, A−n] and channels [A+n, N] or the out-of-band channels, where 0 and N are the bounds of the spectrum (such as the lower and upper bounds of the TV band) and n is the guard band. During the operation cycle, the CPEs report their sensing measurement results to the BS, and the BS performs report processes (e.g., with BS operation modules 218 of BS 210 in FIG. 2). If the next channel is available or validated, the BS selects the pre-defined channel from the hopping pattern or sequence for its next channel switch or hop (e.g., after the end of the operation period, such as every 2 seconds or the like). In a community having more than N+1 channels, one or more channels can be used as a backup channel. In such a community and when the next hopping channel is not available or validated by the sensing process, the BS will switch to the backup channel and remain in hopping mode. When a community possesses N+1 channels and a channel is not available or validated by the sensing process the BSs of the DFHC typically will switch to a non-hopping mode with each member BS operating on one channel with alternating data transmissions and quiet times to allow sensing on the same channel. When the leader can establish a new hopping pattern or sequence with the remaining available channels, the leader may issue new hopping information including a new working set and hopping pattern for the DFHC members. Of course, a number of validation attempts over a particular period of time may be performed prior to removing the channel from the working channel set and defining a new hopping pattern.

Figure 3:
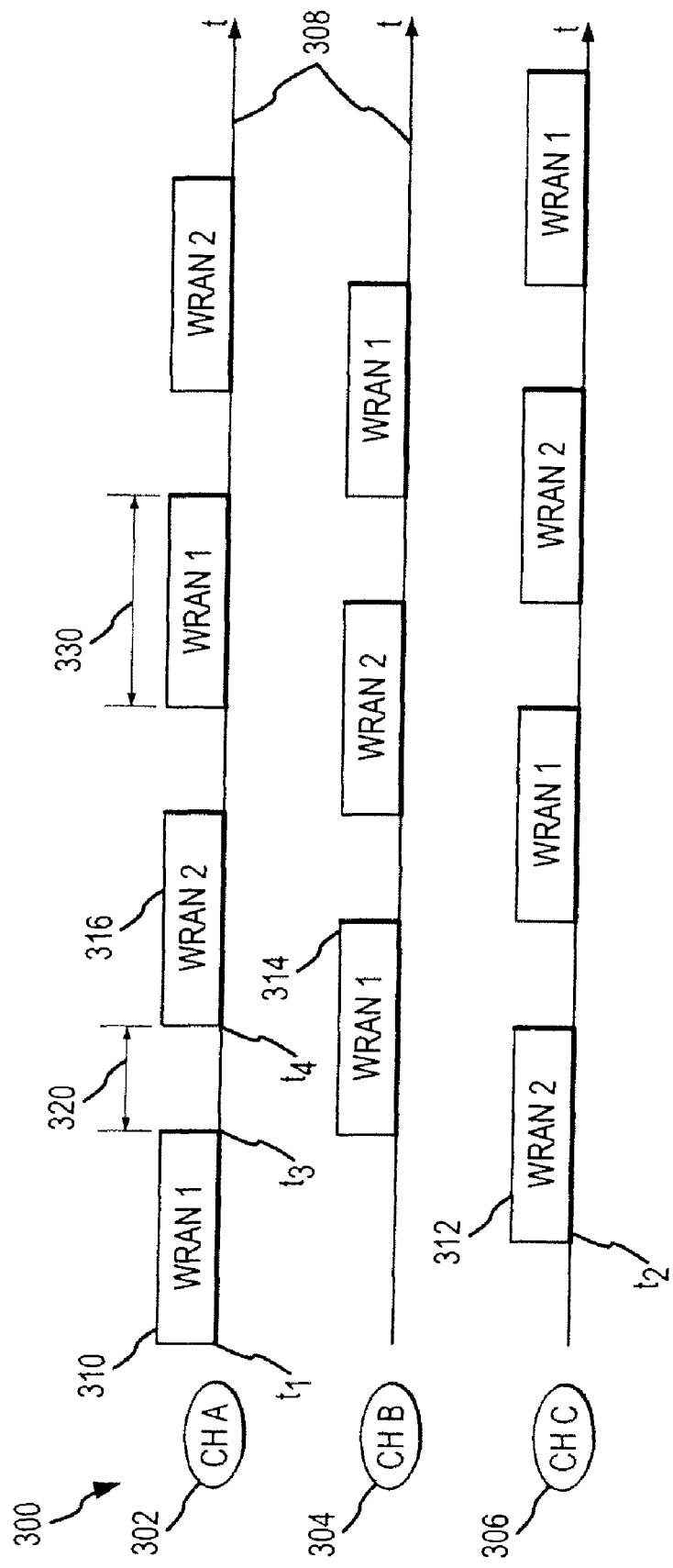
FIG. 3 shows a hopping pattern such as may be defined and provided by a leader of a DFH community (DFHC) of two WRANs using three working channels with the hopping pattern or information providing a hopping sequence for each member of a DFHC including predefined channels to hop or switch to, operation or dwell times, quiet or sensing times, and hop times or timing.

The leader-defined hopping information may define a variety of hopping sequence or patterns to successfully practice the DFHC concepts of the present invention. Generally, the defined hopping pattern will comply with relevant protocol such as with the IEEE 802.22 for WRAN periodic channel availability validation (e.g., operation period of less than about 2 seconds and quiet times of 20 to 100 milliseconds or more depending upon the sensing equipment and/or mechanisms employed). FIG. 3 illustrates one exemplary hopping pattern 300 that may be implemented by a DFHC having two members (i.e., WRAN1 and WRAN2) that utilize a working set of 3 vacant or available channels (i.e., Ch. A, Ch. B, and Ch. C). The pattern provides for clean sensing of each channel while eliminating gaps between transmission of data by each DFHC member as they can switch or hop to a vacant channel upon the end of each operation period as shown on time lines 308.

The pattern 300 may be considered a phase-shifting DFH pattern as each WRAN cell shifts its DFH operation by one quiet time relative to the operation of the previous WRAN cell. For example, as shown at time, $t_1$, WRAN1 begins an operation period (e.g., data transmission) 310 on Ch. A labeled 302. At a later time, $t_2$, offset or shifted by the quiet time 320 (e.g., up to a 100 milliseconds or more depending on the sensing mechanisms with a typical operation period length 330 being equal to or less than 2 seconds where 2 seconds is a maximum period between sensing operations for 802.22 systems), WRAN2 begins an operation period 312 on another channel, i.e., Ch. C labeled 306 (but, of course, Ch. B could have been utilized). A third channel, i.e., Ch. B labeled 304 in FIG. 3, remains vacant and during a quiet time before time, $t_3$, when WRAN1 is scheduled to switch or hop to this channel 304, WRAN1 and WRAN2 operate to perform sensing on this out-of-band channel 304. Some embodiments may only use on of the member base stations to perform such sensing (e.g., WRAN1 prior to its making the hop), but embodiments of the invention use all DFHC member BSs to perform sensing to enhance the sensing accuracy and better protect incumbent services and against possible interference issues with neighboring WRAN. If Ch. B is validated at least by WRAN1, then WRAN1 hops to Ch. B at time, $t_3$, and begins transmissions 314. Likewise, sensing is performed on Ch. A during quiet time 320 prior to time, $t_4$, when WRAN2 begins its next transmission period 316. The start time, $t_4$, generally may be thought of as time, to, plus the length of an operation period 330 plus the length of a quiet time 320, and with this in mind, the start time, t2, for the operations or transmissions 312 for WRAN2 may be thought of as start time, $t_4$, less a quiet time 320 and less the length of an operation period 330. This pattern is then repeated as shown with WRAN1 next hopping to Ch. C and WRAN2 next hopping to Ch. B, and this pattern may be used by the DFHC 180 shown in FIG. 1 to allow the two WRAN 140, 150 to hop among three channels in a synchronized manner with no risk of hopping collisions but efficient utilization of the available channels.

Figure 4:
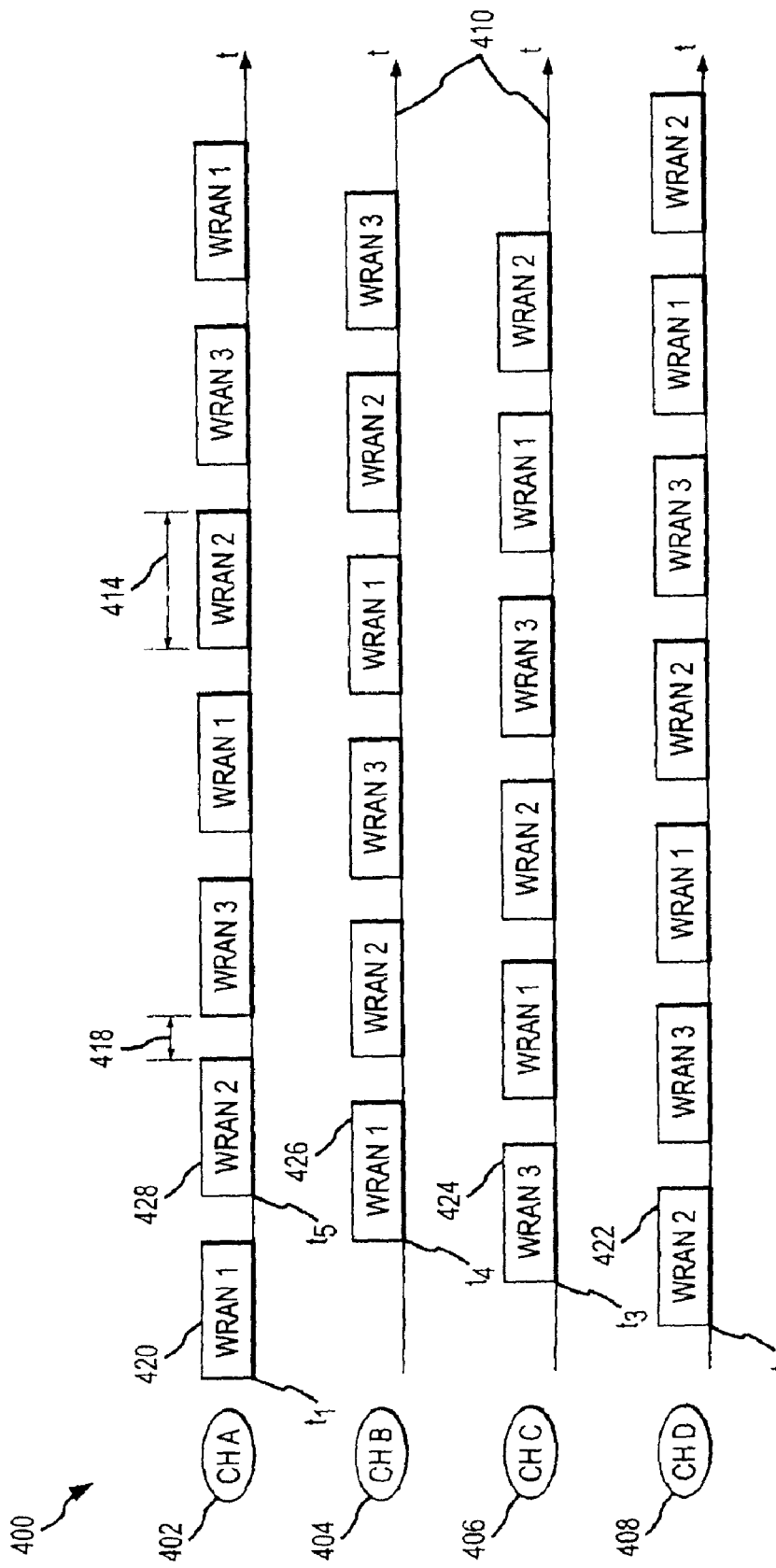
FIG. 4 illustrates a hopping pattern similar to that of FIG. 3 but generated by a leader of a DFHC for a community of three WRANs operating in a synchronized manner on four working channels.

A useful embodiment of a DFHC may include three WRAN or BS cooperating to share the use of four available channels as a working set. FIG. 4 illustrates a hopping pattern 400 that may be defined by such a community (e.g., the community 170 of FIG. 1 with the leader BS 122 acting to generate the pattern 400 to the member BSs 112, 132). As shown, the BS perform simultaneous sensing and data transmission to validate a channel prior to a member hopping to that channel, and, additionally, the pattern 400 utilizes phase shifting to define when and where each DFHC member should hop to coordinate the use of the 4 channels. As shown, the four channels 402, 404, 406, and 408 (shown as Chs. A-D) are utilized for both data transmissions (as shown by boxes labeled with the transmitting WRAN) and for sensing, e.g., clean sensing, over a time line 410. The quiet times 418 between data transmissions last a pre-defined time period such as up to 100 milliseconds or more depending on the sensing mechanisms and IEEE 802.22 protocol and the operation periods 414 generally last a much longer time such as up to 2 seconds or more with 2 seconds being set as a maximum operation period in IEEE 802.22. The pattern 400 calls for data transmissions 420 by WRAN1 to start at a first time, t1, on a first channel 402 (e.g., Ch. A) while data transmissions 422 for WRAN2 start at a later time, t2, on a second channel 408 (e.g., Ch. D at an offset such as an offset equal to the quiet time 418. In the pattern 400, WRAN3 begins operations 424 on a third channel 406 (e.g., Ch. C) at a third time, t3, that is offset from the first and second start times such as one quiet time period from the start of the WRAN2 transmissions and two quiet time periods from the start of the WRAN1 transmissions. The pattern 400 then calls for WRAN1 to start its second operations 426 on a fourth channel 404 (e.g., Ch. B) at a time, t4, immediately after ending its operations 420 by hopping to the vacant channel 404. Likewise, WRAN2 begins its second operations 428 on the first channel 402 (e.g., Ch. A) at a time, t5, immediately after ending its operations 422 on the fourth channel 408. Note, that the offsets are provided to allow each channel to be vacant at least a quiet time 418 to allow sensing to be performed by at least one of the WRAN and more typically all the WRAN in the DFHC prior to a member making a hop or switch to that channel to validate the channel (e.g., to perform clean sensing of the channel prior to the hop). Such an alternating pattern of data transmissions and quiet time is repeated upon each of the channels in the working set, with the leader defining the hop or start times for each operation period, the quiet time for sensing, and the dwell time or operation period for each member of the DFHC. Typically, the length of the operation periods and the quiet times is set statically prior to starting the DFHC operations and remains constant throughout the operation as shown in pattern 400, and also, the operations periods are all of approximately the same length (e.g., up to 2 seconds or some other useful period based on the particular network) as are the quiet times (e.g., 20 to 100 milliseconds or some other useful period depending upon the particular network and/or sensing mechanisms and may be thought of as being larger than the minimum sensing time for a required number of channels such as the working channel or target channel for hopping plus first adjacent channels that may be part of a guard band).

From a review of FIGS. 3 and 4, it can be understood that the concepts of the DFHC combine the use of a leader defined hopping pattern (e.g., patterns 300 and 400 or other useful patterns) with simultaneous sensing and data transmission to simplify frequency hopping in 802.22 and similar systems. DFHC systems in accordance with the invention do not need channel selection for a next hop or switch to be performed each operational period because the next hopping channel (and hopping or start time) is pre-defined by the leader providing hopping information for each member of a DFHC, which is an improvement over many proposed dynamic frequency hopping systems. A community leader typically allocates the same operational period length in an operational or working channel for each community member, and in most cases, the operational period length will be the same on each of the working channels (e.g., operation period generally will not vary depending on the member or on the channel being used for transmissions). In this manner, DFHC configured according to the invention do not use hopping sequences that are generated dynamically during each operation period but yet control or block frequency hopping collisions. Clean sensing generally is provided in the hopping patterns with non-interrupted data transmissions as a BS hops from one channel to a pre-defined channel upon the end of a transmission or operation period (and the CPE serviced by the BS also hop or jump to the pre-defined channel with BS and WRAN being used to discuss hopping in this document). The timing of the BS may be handled by GPS timing or other techniques to provide synchronized compliance with a leader-defined hopping pattern.

As discussed above, each member of a DFHC is represented by its BS, and the BS communicate with neighboring ones of the DFHC to create and maintain the DFHC such as by a leader BS operating to share the hopping pattern for the DFHC. The communications may be handled as discussed above using a bridge CPE, a relay(s), and/or pairs of CPE in an overlap region between neighboring WRANs of the DFHC. Also, in the draft 802.22, a best effort method called coexistence beacon protocol (CBP) is proposed for over-the-air inter-cell communication, and the DFHC systems of the invention may utilize this or similar communication protocol to provide the DFHC functionality described herein. The basic mechanism of CBP involves the BSs of neighboring cells scheduling a coexistence window at the end of every MAC frame, which is synchronized among the BSs. During a coexistence window, neighboring BSs communicate using coexistence beacons. The CBP has been developed for constant channel assignments while in contrast the DFHC method involves the channel assigned for transmission for individual cells to vary over time. Another communication mechanism is known as backhaul inter BS communication. In backhaul, BS communications are based on the usage of a transaction server via a wired network. This approach is appropriate for negotiations in which the delay (due to latency introduced by the network) imparts little impact. Hence, the DFHC method may support inter-cell communications within a DFHC by use a "communication management channel" or CMC upon which the CBP or other protocol may be executed, and this CMC may be defined within the hopping information distributed by the leader BS to facilitate communications among members of a DFHC.

DFHC initialization/creation and maintenance are supported by numerous activities that are grouped under community management (e.g., see the community manager module 220 provided in each BS in FIG. 2). A WRAN or WRAN cell is represented by its BS, which has a unique MAC address and an assigned priority (e.g., a randomly selected number or the like). WRANs attempt to create or join communities, in some embodiments, whenever possible and on an ongoing basis. A single WRAN that has lost association with a community typically reverts, at least temporarily, back to a non-hopping mode (or at least to a DFH mode on channels that are not being used by the DFHC(s)). The association or membership with a DFHC is based on a soft state principle that is subject to renewal within a life-time period that may be set by the leader BS. Again, a lack of renewal of membership typically results in the non-renewing member reverting back into non-hopping mode or to DFH mode in non-shared, available channels.

DFHC management, such as is performed by the DFH community manager 220, may be broken into a number of subparts or mechanisms including neighborhood discovery, DFHC creation including leader election, and DFHC maintenance. A number of messaging schemes or protocols may be utilized during the performance of DFHC management, and the following discussion provides a description of one useful, but not limiting, example of DFHC messages and exemplary formats (e.g., a BS announcement message (BSANN), a member announce message (MBRA), a leader announce message (LDRA), and a community announce message (CMUA)).

To facilitate neighborhood discovery and DFHC maintenance, each BS periodically broadcasts announcement messages (BSANN), such as on the CMC. Two WRAN cells are called one-hop neighbors if control messages such as BSANN can be exchanged. A BSANN message contains the state of the sending BS (such as non-hopping mode, DFHC leader, DFHC member, or the like), a list of known neighbors, a hopping channel list, and the priority of the community leader (if the sending BS belongs to a DFHC). A BSANN is typically transmitted by the BS periodically to transmit BS information to its neighbors and immediately upon leaving a DFHC. An example format for a BSANN message is shown in the following table.

| Syntax | Size | Notes |
|---|---|---|
| BSANN_Message_Format ( ) | | |
| Source BS Address | 48 bits | |
| Destination BS Address | 48 bits | |

-continued

| Syntax | Size | Notes |
|---|---|---|
| Message Type | 2 bits | 00 ... BSANN |
| | | 01 ... LDRA |
| | | 10 ... MBRA |
| | | 11 ... CMUA |
| Reserved | 6 bits | |
| Priority Number | 8 bits | |
| Message Sequence Number | 32 bits | |
| BS State | 2 bits | 00 ... NON_HOP |
| | | 01 ... DFHC_JOIN_REQUEST |
| | | 10 ... DFHC_LEADER |
| | | 11 ... DFHC_MEMBER |
| Reserved | 6 bits | |
| Joining Leader Address | 48 bits | |
| TLV Encoded information | | |

The TLV information for the BSANN message may include the BS's set of neighboring BSs and a channel set of usable or available channels. The format for a BS set may take the following form:

| Syntax | Size | Notes |
|---|---|---|
| BS information element ( ) { | | |
|   Type | 8 bits | TBD |
|   Length | 8 bits | |
|   Number_of_BS | 8 bits | |
|   For(i=0; i< Number_of_BSs; i++) { | | |
|     BS Mac Address | 48 bits | |
|   } | | |
| } | | |

The format for a channel set provided in a BSANN message may be:

| Syntax | Size | Notes |
|---|---|---|
| Channel information element ( ) { | | |
|   Type | 8 bits | TBD |
|   Length | 8 bits | |
|   Number_of_Channels | 8 bits | |
|   For(i=0; i< Number_of_Channels; i++) { | | |
|     channel central frequency | 8 bits | |
|     Channel number | 8 bits | For channel bonding |
|   } | | |
| } | | |

Each BS uses BSANN messages to maintain relationship with its one-hop neighbors. A BS broadcasts BSANN periodically if it works in DFHC mode or if it is trying to work in DFHC mode and it has detected enough usable channels (e.g., if available channels are more than its one-hop neighbors working in non-hopping mode). Each BS may maintain a 32-bit BS_SEQ_NUM. Before a BS transmits a BSANN message, it may increase the BS_SEQ_NUM by 1 and fill the BSANN sequence number field. If the BS_SEQ_NUM has already been assigned to be the largest possible unsigned 32-bit integer number (i.e. 4294967295), then when it is incremented, it will have a value 0. When a BS receives a BSANN message from a neighbor, the received BSANN (e.g., the Message Sequence Number) is compared with its stored neighbor (e.g., the Message Sequence Number). If {BSANN (Message Sequence Number)>neighbor(Message Sequence Number)} && {BSANN(Message Sequence Number)–neighbor(Message Sequence Number)} <2147483648||{BSANN(Message Sequence Number) <neighbor(Message Sequence Number)} && {neighbor (Message Sequence Number)–BSANN(Message Sequence Number)}>2147483648 is true, the BSANN is a new one (or another testing method may be used to determine if a message is new) and shall be accepted. Otherwise the receipted BSANN message shall be discarded. In some embodiments, each BS uses the same algorithm to decide if the other messages (LDRA, MBRA, CMUA) are newer messages rather than stale or previously received messages that should be discarded or ignored.

The BS also fills priority value, usable channels, state (NON_HOP, DFHC_JOIN_REQ, DFHC_LDR, DFHC_MBR), joining leader address, and one-hop neighbors fields of its BSANN message. BSANN messages are typically sent every BS_ANNOUNCE_INTERVAL or a predefined communication period, which may be set by BS leaders or otherwise programmed into the BS. If a BS can not receive BSANN message from its neighbor for three BS_ANNOUNCE_INTERVALs, the neighbor relationship with that neighbor is lost. If a BS receives a new BSANN message from its neighbor, it creates neighbor information entry or updates the corresponding neighbor information entry. These neighbor information sets or files are used for leader election and joining community selection.

After a neighborhood of WRAN is discovered, a DFHC may be created and DFHC creation typically begins with the election of one of the member BS as a community leader. Each DFHC may include a leader and zero (0) or more members, and the BS working in hopping mode need to exchange hopping information among neighbor BSs to create and maintain the community. As noted above, the inter-BS communications can use over-the-air links (e.g., enhanced CBP, a CPE bridge, a relay, or the like) or an IP network (e.g., after a BS gets its one-hop neighbors' IP addresses). Inter-BS communications are distributed communicant and are generally managed by the leader BS, and a number of methods may be used to elect the leader BS to practice the present invention.

An exemplary community leader election method 500 is shown in FIG. 5. The method 500 starts at 504 at which point each BS has been assigned a priority value and a MAC address. In general, the BS with the lowest (or alternatively the highest) priority value is elected as DFHC community leader. If at least two BSs have the same lowest priority value, the BS among the tied BSs with the lowest (or highest) MAD address is elected the DFHC community leader. After a BS transmits the first BSANN message, it waits an interval (i.e., a LEADER_SELECTION_INTERAL) to decide if it is the leader. If no high priority BSANN message with a non-hop state (i.e., NON_HOP status or state) is received, the BS elects itself as the community leader and transmits a LDRA message. Every BS preferably utilizes the same leader election algorithm (e.g., the method 500 of FIG. 5 or other useful algorithm that may be implemented by a leader election 232 portion of a creation module 230 in a BS 210 as shown in FIG. 2) to ensure the leader is elected or selected correctly (or at least that agreement among the BS of a DFHC).

As shown in FIG. 5, the BS checks if there are any unchecked neighbors. If yes, at 510, the BS gets the next unchecked neighbor's information (e.g., from a received BSANN message). At 512, the BS determines if this neighbor is a leader and if yes, the neighbor is marked as checked and the method 500 continues at 508. If no, the method 500 continues at 516 with the BS determining whether the neighbor WRAN or BS is a community neighbor. If the neighbor is a member the method 500 continues at 508, but if not, the method 500 continues at 520 with determining if the neighbor is a higher-priority, non-hop neighbor. If not, the method 500 continues at 508, but if yes, the method stops at 524 (i.e., with the BS failing to elect itself as the leader). At 508, when all neighbors have been checked, the method 500 continues at 530 with a determination of whether there are more than 2 usable or available channels, and if not, the method stops at 532 with a failure to form a DFHC. If yes, the method 500 continues at 540 with the BS electing itself as a community leader. At 546, the newly elected leader BS acts to select 2 or more usable channels from the available channel set to be the working channels set for the DFHC, with the number depending upon the neighbors joining to form the DFHC with at least one spare typically being used. Step 546 also includes the leader BS acting to calculate or generate the hopping information for the DFHC including defining a hopping pattern or sequence to be followed by every member of the DFHC. The method 500 ends at 550.

Two neighboring BSs may announce themselves as community leaders at almost the same time by transmittal of a LDRA message. In this case, the BS with the lower priority may choose to join the community announced by the higher priority BS. If a BS decides to join a community after it receives a community LDRA message, it sends a MBRA message to the announcing community leader. If a community LDRA message is received by a BS with a higher priority value and the receiving BS wants to join the community, the later joining BS generally respects the prior election or selection of the leader and joins as a member of the community. The community leader maintains each of the members' one-hop neighbor information and available channel information, and the leader BS uses this information to decide if a requesting BS is accepted as a new community member. As noted, each BS believing itself to fulfill the requirements of leader (e.g., the lowest or highest priority value with a MAC address value used as a tie breaker for example) within a neighborhood declares itself the DFHC leader. The declared leader selects a set of hopping channels or a working channel set and broadcasts a generated hopping pattern along with its leadership claim using LDRA messages, which may be sent on the CMC, via bridge CPEs or the like. An LDRA message contains a list of community members (which at the beginning may be just the leader itself) and the selected hopping or working channels with the hopping pattern of the DFHC. The LDRA message may be sent periodically, after selection of itself as a new leader, and after generation of new hopping information (e.g., a hopping pattern including start time and dwell time in each working channel of the hopping channel set for each member), and the LDRA message may have the following format.

| Syntax | Size | Notes |
| --- | --- | --- |
| LDRA_Message_Format ( ) { | | |
|   Source BS Address | 48 bits | |
|   Destination BS Address | 48 bits | |
|   Message Type | 2 bits | 00...BSANN |
| | | 01...LDRA |
| | | 10...MBRA |
| | | 11...CMUA |
|   Reserved | 6 bits | |
|   Priority Number | 8 bits | |
|   Message Sequence Number | 32 bits | |
|   Hopping Information Sequence Number | 32 bits | |
|   Leader Timer Value | 32 bits | The community members use this value to synchronize with their leader |
|   Scheduling Effective time | 32 bits | When does this community uses the hopping information |
|   TLV Encoded information | | |
| } | | |

The LDRA message may include the following TLV or encoded information: a hopping information set, a channel set of usable channels, a set of BS community members, and a channel set of the working channels selected from the set of usable channels.

A BS operating a WRAN in non-hopping mode may decide to create a community if no LDRA message is received using the above discussed method. However, upon receiving LDRA messages from one or more leaders, a BS working in non-hopping mode (or not part of a community) may decide to join one of the "advertised" communities. The decision may be made using the received LDRA message, its neighbor information, and usable channels, e.g., a BS may attempt to join a DFHC when a new LDRA message is received from its neighbor or it determines that it has more usable channels after performing sensing. A BS may use or implement a number of routines or algorithms (e.g., as shown as member join/add routine or module 234 in base station 210 of FIG. 2) to request to join a community. Typically, the algorithm will meet the following: all members of the new community are one-hop neighbors of each other and the number of usable channels in the new community is larger than the number of the members in the community when the requesting BS is included or added to the community.

Figure 6:
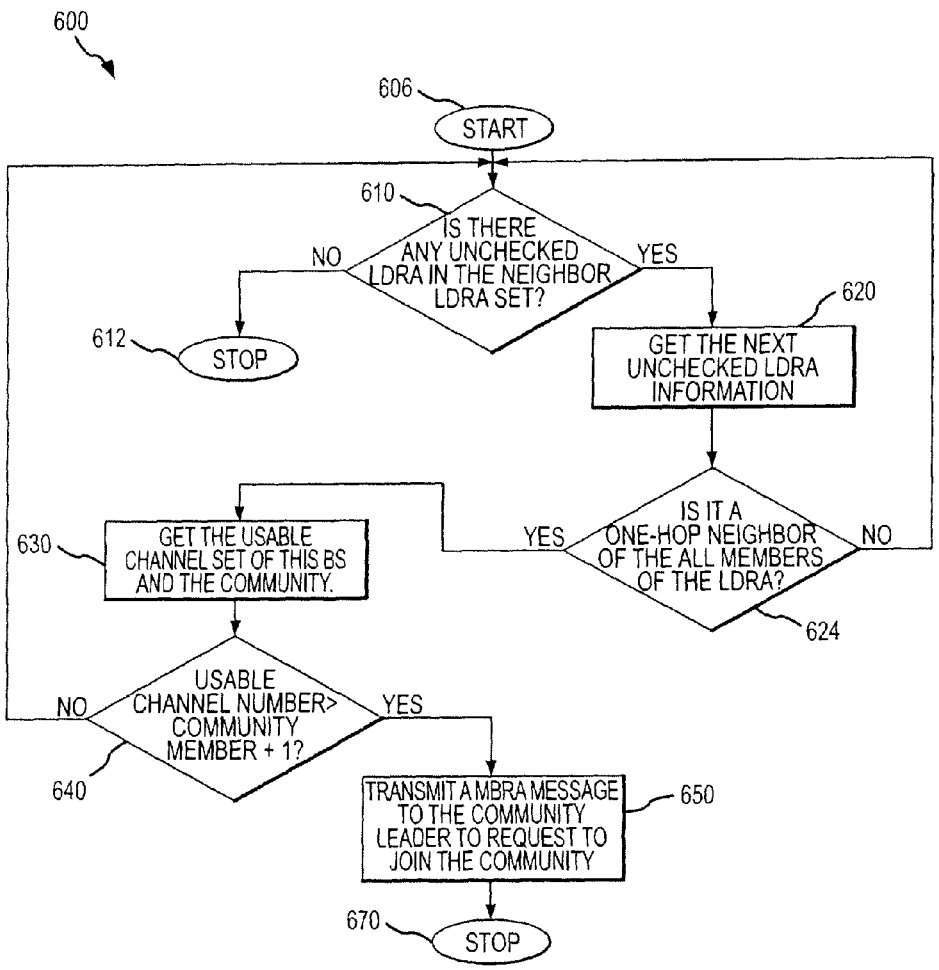
FIG. 6 is a flow diagram illustrating a process for allowing new WRANs to join an existing DFHC.

FIG. 6 illustrates a community joining method 600 of one embodiment of a DFHC system. The method 600 starts at 606 typically with a BS receiving a LDRA message or a BS deciding whether to join a DFHC based on a previously received LDRA message. At 610, the BS determines whether there are any unchecked LDRA messages in the neighbor LDRA set, and if not, the method 600 stops at 612. If there are unchecked LDRA messages, the method 600 continues at 620 with the BS retrieving information from the next unchecked LDRA message. At 624, the BS determines whether it is a one-hop neighbor of all the members of the DFHC identified by the LDRA message. If not, the method 600 continues at 610. If a one-hop neighbor, the method 600 continues at 630 with the BS retrieving its usable channel set and that of the DFHC of interest. At 640, the BS determines whether the number of usable channels is greater than the present number of members in the DFHC plus one (i.e., to account for the BS wanting to join). If not, the method 600 continues at 610. If their would be an extra vacant channel in the available channel set, the method 600 continues at 650 with the BS transmitting a MBRA message to the leader of the DFHC to request that the BS be allowed to join the DFHC as a member, and the method 600 ends at 670. An exemplary MBRA message may have the following format.

| Syntax | Size | Notes |
|---|---|---|
| MBRA_Message_Format ( ) { | | |
|   Source BS Address | 48 bits | |
|   Destination BS Address | 48 bits | |
|   Message Type | 2 bits | 00 ... BSANN |
| | | 01 ... LDRA |
| | | 10 ... MBRA |
| | | 11 ... CMUA |
|   Reserved | 6 bits | |
|   Priority Number | 8 bits | |
|   Message Sequence Number | 32 bits | |
|   Hopping Information Sequence Number | 32 bits | |
|   MBRA Type | 2 bits | 00 ... REQ_JOIN |
| | | 01 ... ACK_LDRA |
| | | 10 ... NAK_SCHED |
| | | 11 ... reserved |
|   Reserved | 6 bits | |
|   TLV Encoded information | | |
| } | | |

The MBRA message may include the following TLV encoded information: the BS's set of neighboring BSs and the BS's channel set of usable channels.

The MBRA message contains the targeted community leader's identification and the neighborhood and channel availability information of the requesting BS. Upon receiving the MBRA message, the leader decides whether to accept or reject the joining request and sends an acknowledgement containing the decision to the requesting BS. The leader may first perform maintenance actions on the existing community to assure that the joining BS fits into the hopping pattern or into a new hopping pattern that may be used after the BS joins as a new member. In some embodiments, each time a BS transmits a MBRA message for joining a DFHC, it waits a period of time (e.g., an INTER_BS_TRAVERSAL_TIME that may just be a predefined number of milliseconds) for the reception of a LDRA message. If a response is not received within that time, the joining BS sends a new MBRA message, with a limit typically being set on retries (e.g., up to MBRA_RETRIES such as up to 3 retries or the like). If the MBRA message has been sent for this number of retries without a reply from the leader, the joining BS ends this joining attempt and remains in its prior operating mode such as non-hopping mode. If a received LDRA message shows that the community leader accepted the joining request, the joining BS sends another MBRA message to the community leader to acknowledge the reception of the LDRA and its new membership in the community.

Figure 7:
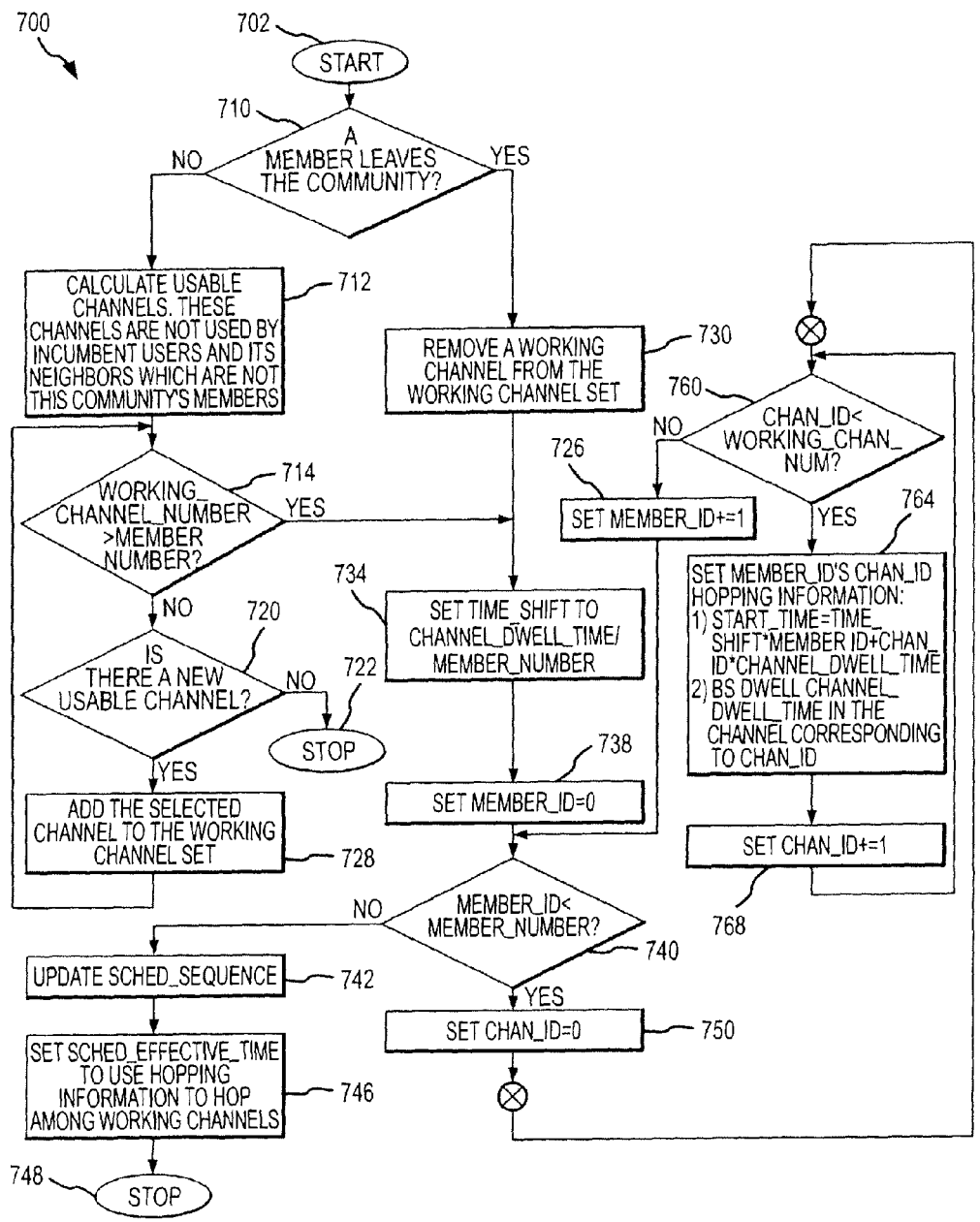
FIG. 7 is a flow diagram illustrating an embodiment of an algorithm or method for defining hopping information including setting a hopping schedule for each member of a DFHC.

As discussed above, the community leader acts to define a set of hopping information and, particularly, a hopping pattern or sequence that is passed to each member of a DFHC. The community leader can use a number of mechanisms or algorithms to calculate or generate this hopping schedule (with the algorithm implemented or performed, for example, by the hopping information generator 236 of the BS 210 shown in FIG. 2). A useful algorithm for an IEEE 802.22 implementation of a DFHC may set the dwelling time in each channel at less than about 2 seconds and the quiet time between one operation/transmission period (or dwelling time) and a next operation/transmission period (or dwelling time) on a working channel at a time larger than an incumbent user's required time and/or based on sensing mechanisms (e.g., a time period of up to 100 milliseconds or more). FIG. 7 shows one useful, but not limiting, method 700 for generating a hopping pattern or sequence for use by a BS acting as a community leader. The method starts at 702, e.g., after election of a leader. In the method 700, the selected number of the working channels equals the number of the community members plus one (N+1 where N is the number of community members), but other algorithms may provide for more than one extra channel (e.g., provide for one or more spare channels). Further, the method 700 calls for the dwelling or operation time in each channel to be 2000 milliseconds or 2 seconds, as is currently called for in IEEE 802.22 but differing dwell time may be used in some applications. The quiet time between operation periods or dwell times on a channel is set at the channel dwell time divided by the number of community members (which provides a value that is at least large enough to perform sensing before a jump and has typically been found to support phase shift frequency hopping patterns).

As shown in FIG. 7, the method 700 calls for at 710 the leader BS to determine if the hopping pattern is being generated in response to a member leaving the community. If yes, a channel is removed from the current set of working channels at 730. Then, at 734, the BS resets the time shift value or offset value to the channel dwell time (previously defined by the BS or set at a default value such as 2000 milliseconds to meet a particular protocol such as IEEE 802.22) divided by the number of members (e.g., the original number of members minus one due to the leaving BS). At 738, the BS sets the member ID to zero, and at 740, the BS determines whether the member ID is less than the number of members. If not (i.e., the hopping modes of all the members in the community are calculated), than at 742, the leader BS updates the scheduling sequence using the new time shift or offset value (e.g., the quiet time), new set of working channels, and new set of working members (see, for example, the hopping patterns using phase shifting shown in FIGS. 3 and 4). At 746, the leader BS sets a time for which the new hopping schedule should become effective (i.e., when the remaining community members should stop using the old hopping schedule and start using the new schedule), and the method 700 stops at 748.

At 740, if the member ID is less than the number of members, at 750 the BS sets the channel ID to zero and at 760 determines whether the channel ID is less than the number of working channels. If yes, at 764, the leader BS sets the channel hopping information for the member with the member ID as shown. Then, at 768, the leader BS increases the channel ID by one and returns the method to 760. If the channel ID is not less than the number of working channels at 760, the method 700 continues at 726 with the leader BS increasing the member ID by one and the method 700 continues at 740.

If at 710, the leader BS determines that a member did not leave the DFHC, the method 700 continues at 712 with the leader BS determining the set of usable channels. As note in FIG. 7, these channels are vacant or not used by either the incumbent users or the non-community member neighbors of the DFHC members. At 714, the leader BS determines whether the number of working channels is greater than the number of members in the DFHC. If yes, the method 700 continues at 734 as discussed above. If no, the method 700 continues at 720 with the BS determining whether there are any new usable channels in the available channel set. If not, the method 700 stops 722 without a hopping pattern being generated because there are not enough working channels available. If yes, the method 700 continues at 728 with the leader BS adding a selected new channel to the working channel set and then returning control to 714.

The format and content of the hopping information sent by the leader BS to the members may be as shown in the following table.

requesting BS joins the community) and the requesting BS is the neighbor of all the community members, the leader accepts the joining request.

To maintain a DFHC, each community leader sends a LDRA message periodically such as every LEADER_ANNOUNCE_INTERVAL milliseconds (e.g., a pre-defined number of milliseconds). If a community leader does not receive any MBRA message from a community member for a preset limit such as a MEMBER_ACTIVE_INTERVAL, the

| Syntax | Size | Notes |
| --- | --- | --- |
| Hopping information element ( ) { | | |
|   Type | 8 bits | |
|   Length | 8 bits | |
|   Number_of_Hopping_Informations | 8 bits | |
|   For(i=0; i< Number_of_Hopping_Informations; i++) { | | |
|     Member ID | 48 bits | |
|     Time to hop | 32 bits | This field is set to the time relative to the hopping effective time when the member first uses this channel. Then the member periodically uses this channel. |
|     Channel dwell time | 32 bits | This field is set to the time (milliseconds) dwelling in this channel each time the member hops to this channel |
|     Channel central frequency | 8 bits | |
|     Channel number | 8 bits | For channel bonding |
|   } | | |
| } | | |

Each community leader maintains a community LDP_SEQ_NUM or leader provided sequence number. Before a community leader sends a LDRA message, the LDP_SEQ_NUM is increased by 1. The community members use this sequence number to decide if the received LDRA message is a new message. A community leader maintains a HOP_SEQ_NUM or hop sequence number. Before the community leader calculates and transmits the new hopping information, the community leader increases the HOP_SEQ_NUM by 1. The community members then can use this sequence number to decide if the received LDRA message carries new channel hopping information such as a new hopping pattern. The algorithm to decide if the HOP_SEQ_NUM or LDP_SEQ_NUM is new may be the same as that for processing BS_SEQ_NUM.

After receiving a community MBRA message, the community leader may decide if the received message is a new message based on its stored MBR_SEQ_NUM and the MBR_SEQ_NUM carried in the received message. If the received MBRA message is an old message, the message is discarded silently. Otherwise, the community leader updates its stored sequence number of that member. The community leader also stores the member's one-hop neighbors, available channel set, priority value, and MBR_SEQ_NUM. The community leader use these to determine when and which channel to hop for this member.

If the leader BS receives and accepts a BS's joining request, it sends out a community LDRA message to indicate that the DFHC community includes the new joining BS. If the community leader rejects the joining request, it sends out a community LDRA message to reflect this rejection. An IEEE 802.22 implementation may implement any algorithm to accept a joining request as discussed above and a simple algorithm may be stated that if there are enough usable channels (usable channels is more than members plus 1 after the leader BS determines that the member has left and the frequency hopping sequence is recalculated. The recalculation may involve: (a) changing channel frequency sequences of the remaining members and setting the working period of each channel of the leaving member as idle or (b) removing a channel from the working channel set, setting its state to backup, and using the remaining working channels to reallocate channel hopping information.

If the LDRA message requires an acknowledge for the newly sent channel hopping information from each community member, the leader BS waits a time period or INTER_BS_TRAVERSAL_TIME milliseconds for the reception of community MBRA messages. If responses are not received within that time, the community leader may send a new LDRA message with a preset number of retries, e.g., up to LDRA_RETRIES. The time slot between the effective starting time and the time of the first transmission of a community LDRA message, which includes new frequency hopping information, typically is selected to be long enough to guarantee that all community members receive the new hopping information and hop according to the new information in a timely manner.

Maintenance of the DFHC carried out by a leader BS and member BS (such as by maintenance module 240 of the base station 210 as shown in FIG. 2) may include re-election of the community leader if the original leader leaves. Maintenance may also include re-calculation of the hopping information for each member if a member leaves the DFHC. If a BS joins the community, the hopping pattern may be modified to determine when and to which channel each member of the new DFHC should hop, and, of course, maintenance will include transmitting the new hopping pattern to the community members. Maintenance may also be considered to include periodic transmission of BSANN messages, LDRA messages, replying with MBRA messages after receiving LDRA messages, and periodic transmission of community announcement (CMUA) messages.

Overlapping communities preferably coordinate their operations to reduce the risk of using the same working channels, and this is supported by the periodic transmission of the CMUA messages. These messages may take the following form, with the TLV encoded information including a set of the working channels used by the DFHC.

| Syntax | Size | Notes |
|---|---|---|
| CMU_Message_Format ( ) { | | |
|    Source BS Address | 48 bits | |
|    Destination BS Address | 48 bits | |
|    Message Type | 2 bits | 00 ... BSANN |
| | | 01 ... LDRA |
| | | 10 ... MBRA |
| | | 11 ... CMUA |
|    Reserved | 6 bits | |
|    Priority Number | 8 bits | The priority number of its leader |
|    Mac Address of Its Leader | 48 bits | |
|    Message Sequence Number | 32 bits | |
|    TLV Encoded information | | |
| } | | |

In this example, the CMUA message includes the working channel set used by the community, a community sequence number, the leader's priority value, and the leader's MAC address. Each BS working in DFHC mode maintains a community sequence number. Before a community leader or a community member sends a CMUA message, the community sequence number is incremented (e.g., increased by 1). The neighbor community uses the sequence number and source MAC address to decide if the received CMUA message is a new message from its neighbor community. The process or algorithm to decide if a community sequence number is a new one can be the same as that of processing BS_SEQ_NUM. A BS typically discards the old CMUA silently.

If a community member gets new hopping information from its leader, it sends a CMUA message in response. After a community leader calculates new hopping information, it sends a CMUA message. Each community member also sends CMUA messages periodically to notify its neighbor communities about its occupied channels. The channels being included in a received CMUA message are labeled as occupied by the receiving BS. These channels and sensed busy channels are preferably not included in the available channel set being sent out by community MBRA messages. In case the CMUAs from the neighbor DFHC community are lost or two neighbor communities calculate hopping information at almost the same time, the two neighbor communities may select the overlapped channel set as the working channels. If this happens, the BS which is in the DFHC community with low priority and detects this overlap may give up and release the overlapped working channels (or another negotiation or tie breaker technique may be utilized).

Community members or their BS may also perform a number of actions during operation of a DFHC. For example, each community member may maintain a member sequence number in their BS memory or MBR_SEQ_NUM. The community leader can use this sequence number to decide if a received MBRA message is a new message from this member. Before a community member sends out a MBRA, its MBR_SEQ_NUM is incremented such as by increasing it by 1. The HOP_SEQ_NUM is also copied into BS memory by the member BS from the received community LDRA message. The HOP_SEQ_NUM is used by the BS member for acknowledging the received channel hopping information. The algorithm or process to decide if a MBR_SEQ_NUM is a new sequence may be the same as that used for processing the BS_SEQ_NUM. After receiving a LDRA message, the community member BS and joining BS decide if the received message is a new one based on their stored leader sequence number (i.e., LDR_SEQ_NUM) and the LDP_SEQ_NUM carried in the received LDRA message. If the received LDRA message is an old message, the message is discarded, e.g., silently. Otherwise, the community member BS updates its stored LDP_SEQ_NUM.

After receiving a LDRA message, the community member determines whether the received message carries new hopping information such as based on its stored HOP_SEQ_NUM and the HOP_SEQ_NUM carried in the received message. If the received LDRA message carries new hopping information, the member BS updates its stored HOP_SEQ_NUM and stores the hopping information for this member for use in future frequency hopping operations. If a community member BS receives a LDRA message with new hopping information, the community member BS sends a community MBRA message that includes the new HOP_SEQ_NUM to acknowledge the receipt of the LDRA message. When a community member BS receives new channel hopping information and when the defined start time for beginning use of this new or replacement hopping information, the DFHC community members all switch to DFHC stable state and use the pre-defined frequency hopping information (e.g., the hopping pattern or sequence) to decide when and which channel to switch. Before the first community hopping information is effective, the community member may work in non-hopping mode or use the old channel hopping information.

After receiving hopping information being carried in a LDRA message, the community member BS may store the channel hopping information of all the members. This storing can simplify the processing if it is selected as new community leader and may also make no change to the community member's channel hopping. Each time a member receives a new LDRA message from its leader BS, it sends a MBRA message to the leader in response. This MBRA message is used by the member BS to tell the leader BS that it is presently operable as a member in the DFHC. If community members do not receive any LDRA message from the community leader for a leader activity period or LEADER_ACTIVE_INTERVAL, they preferably return to non-hop mode (or other non-interfering operating mode) and may act to elect a new leader with the remaining members or differing members forming a DFHC.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the available channels used by DFHC for defining a working set of channels generally will be chosen from the spectrum previously assigned by regulatory groups for use with television or the TV band, but the concepts of the DFHC may be used with other frequency ranges and particularly other bands that involve protecting licensed or other incumbent users. Similarly, channel size is not a limiting feature of the invention with typical channels of 6 MHz, 7 MHZ, and 8 MHz being useful examples for DFHC that are occupying channels that may be used by TV receivers and transmitters.

We claim:

1. A communication system for managing use of channels in a frequency spectrum having available channels and unavailable channels in use by incumbent services, comprising:
   a base station wirelessly communicating with a first plurality of consumer premise equipment sites and functioning as a leader of a frequency hopping community; and
   a set of base stations each wirelessly communicating with a second plurality of consumer premise equipment sites and each functioning as a member base station of the frequency hopping community,
   wherein the leader base station generates a hopping pattern defining a dwell time for data transmissions operation periods and start times for the operation periods on each one of a working set of channels for the leader base station and for the member base stations and defining when each of the leader base station and the member base stations switch to another one of the channels in the working set, whereby only one of the set of base stations operates on one of the channels in the working set at a time
   wherein the base station functioning as the leader receives an identification of the available channels from the base stations functioning as members,
   wherein the leader base station transmits the hopping pattern to each of the member base stations, and
   wherein the leader base station and the member base stations communicate with the consumer premise equipment sites according to the hopping pattern.

2. The system of claim 1, wherein the base station functioning at the leader selects a subset of available channels as the working set of channels.

3. The system of claim 1, wherein the base station functioning as the leader is selected as the leader based upon a priority relative to at least one other base station in the frequency hopping community.

4. The system of claim 1, wherein the base station function as the leader is selected as the leader based upon an absence of other relative neighbor base station in the frequency hopping community.

5. The system of claim 1, wherein the base station functioning as the leader includes a leader priority number MAC address and the leader is selected as the leader based upon the leader priority number MAC address relative to priority number MAC addresses of other base stations in the frequency hopping community.

6. The system of claim 1, wherein the base station functioning as the leader generates a new frequency hopping pattern responsive to a change in active status of base stations in the frequency hopping community.

7. The system of claim 1, wherein the base station functioning as the leader determines whether the frequency hopping community will accept another base station into the frequency hopping community.

8. The system of claim 7, wherein the base station functioning as the leader makes the determination based upon whether the another base station is capable of fitting into a new hopping pattern for the frequency hopping community.

9. The system of claim 7, wherein the base station functioning as the leader makes the determination based upon whether the another base station is a one-hop neighbor of the base stations in the frequency hopping community.

10. The system of claim 1, wherein the base station functioning as the leader makes the determination whether a base station has left the frequency hopping community.

11. A base station functioning as a leader of a frequency hopping community to manage operations of base stations wirelessly communicating with end users in cells over available channels, comprising:
    memory storing a set of available channels determined to be vacant and a list of base stations including the leader base station that are members of the frequency hopping community;
    a processor managing the memory and executing one or more software modules;
    a community manager software module executed by the processor selecting a subset of the available channels as a working set and generating a hopping pattern for the frequency hopping community; and
    a communication software module executed by the processor transmitting a message to other ones of the member base stations including the generated hopping pattern wherein the communication software module operates to receive messages from the other ones of the member base stations including sensing information for available channels, the community manager software module responding by updating the stored set of available channels, choosing a new working set of the available channels, and repeating the hopping pattern generated using the new working set.

12. The base station of claim 11, wherein the community manager software module generates a new frequency hopping pattern responsive to a change in active status of base stations in the frequency hopping community.

13. The base station of claim 11, wherein the community manager software module operates to determine whether the frequency hopping community will accept another base station into the frequency hopping community.

14. The base station of claim 13, wherein the determination of whether to accept another base station into the frequency hopping community is based upon whether the another base station is capable of fitting into a new hopping pattern for the frequency hopping community.

15. The base station of claim 13, wherein the determination of whether to accept another base station into the frequency hopping community is based upon whether the another base station is a one-hop neighbor of the base stations in the frequency hopping community.

16. The base station of claim 11, wherein the community manager software module operates to determine whether a base station has left the frequency hopping community.

17. A semi-dynamic frequency hopping method for use in wireless regional area network (WRAN) systems, comprising:
    providing two or more WRANs each operated by base stations to wirelessly communicate with consumer premise equipment (CPE);
    electing one of the base stations as a leader of a frequency hopping community having the base stations as members; and
    operating the leader base station to receive a message from other member base stations indicating available channels and to determine a set of channels available for use by the frequency hopping community, and
    with the leader base station, selecting a subset of the available channels as a working set of channels and generating a hopping sequence.

18. The method of claim 17, wherein the operating of the base stations according to the hopping sequence is performed for a plurality of operation periods for each of the base stations without modifying the hopping sequence.

19. The method of claim 17, further comprising operating the leader base station to receive a message from one of the member base stations indicating one of the channels in the working set is unavailable and, in response, repeating the selecting, generating, and transmitting steps with the base station to generate a modified hopping sequence with a modified working set of the available channels without the unavailable channel.

20. The method of claim 17, further comprising with the leader base station receiving a request from another base station to join the frequency hopping community, operating the leader base station to repeat the selecting of a working set of channels, generating a new hopping sequence, and transmitting the new hopping sequence responsive to accepting the another base station into the frequency hopping community.

21. The method of claim 17 wherein the leader base station receives an identification of available channels from the base stations functioning as members.

22. The method of claim 17, wherein electing one of the base stations as the leader is based upon a priority relative to at least one other base station in the frequency hopping community.

23. The method of claim 17, wherein the base stations elected as the leader includes a leader MAC address and wherein electing the leader is based upon the leader MAC address relative to MAC addresses of other base stations in the frequency hopping community.

24. The method of claim 17, wherein the leader base station further operates to generate a new frequency hopping pattern responsive to a change in active status of base stations in the frequency hopping community.

25. The method of claim 17, wherein the leader base station operates to determine whether the frequency hopping community will accept another base station into the frequency hopping community based upon whether the another base station fits into the hopping sequence or is capable of fitting into a new hopping sequence for the frequency hopping community.

26. A method for managing operations of a community of frequency hopping base stations in wireless regional area network (WRAN) systems by an elected leader base station, the method comprising:
  receiving an identification of the available channels from members of the community of frequency hopping base stations;
  selecting a subset of available channels as a working set of channels;
  generating a frequency hopping sequence defining for each of the members of the community of frequency hopping base stations a next one of the channels in the working set to operate upon, a time to make a switch to the next one of the channels, and an operational period on the next one of the channels after the switch; and
  notifying member base stations of the community of frequency hopping base stations of the frequency hopping sequence for performing frequency hopping according to the frequency hopping sequence.

27. The method of claim 26, further comprising determining a set of channels available for use by the community of frequency hopping base stations.

28. The method of claim 26, further comprising receiving a message from at least one of the member base stations indicating one of the channels in the working set is unavailable and, in response, repeating the selecting, generating, and transmitting steps to generate a modified hopping sequence with a modified working set of the available channels without the unavailable channel.

29. The method of claim 26, further comprising receiving a request from another base station to join the community of frequency hopping base stations, determining whether the frequency hopping community will accept the another base station.

30. The method of claim 29, wherein the elected leader base station makes the determination based upon whether the another base station fits into the hopping sequence or is capable of fitting into a modified hopping sequence of the frequency hopping community.

31. The method of claim 29, wherein the elected leader base station makes the determination based upon whether the another base station is a one-hop neighbor to member base stations of the community of frequency hopping base stations.

32. The method of claim 26, further comprising determining whether a base station has left the community of frequency hopping base stations.

33. A base station functioning as a member in a community of frequency hopping base stations in wireless regional area network (WRAN) communicating with end users in cells over available channels, comprising:
  memory storing a set of available channels determined to be vacant and a list of base stations that are members of the frequency hopping community;
  a processor managing the memory and executing one or more software modules;
  a communication software module executed by the processor receiving a message wherein the message includes a hopping pattern and a subset of the available channels designated as a working set and wherein the communication software module operates to transmit a message to a leader base station including sensing information for identification of available channels; and
  a software module executed by the processor executing the hopping pattern for the frequency hopping community.

34. The base station of claim 33, wherein the leader base station updates the stored set of available channels, and designates a new working set of the available channels for the hopping pattern.

* * * * *